Patented July 10, 1951

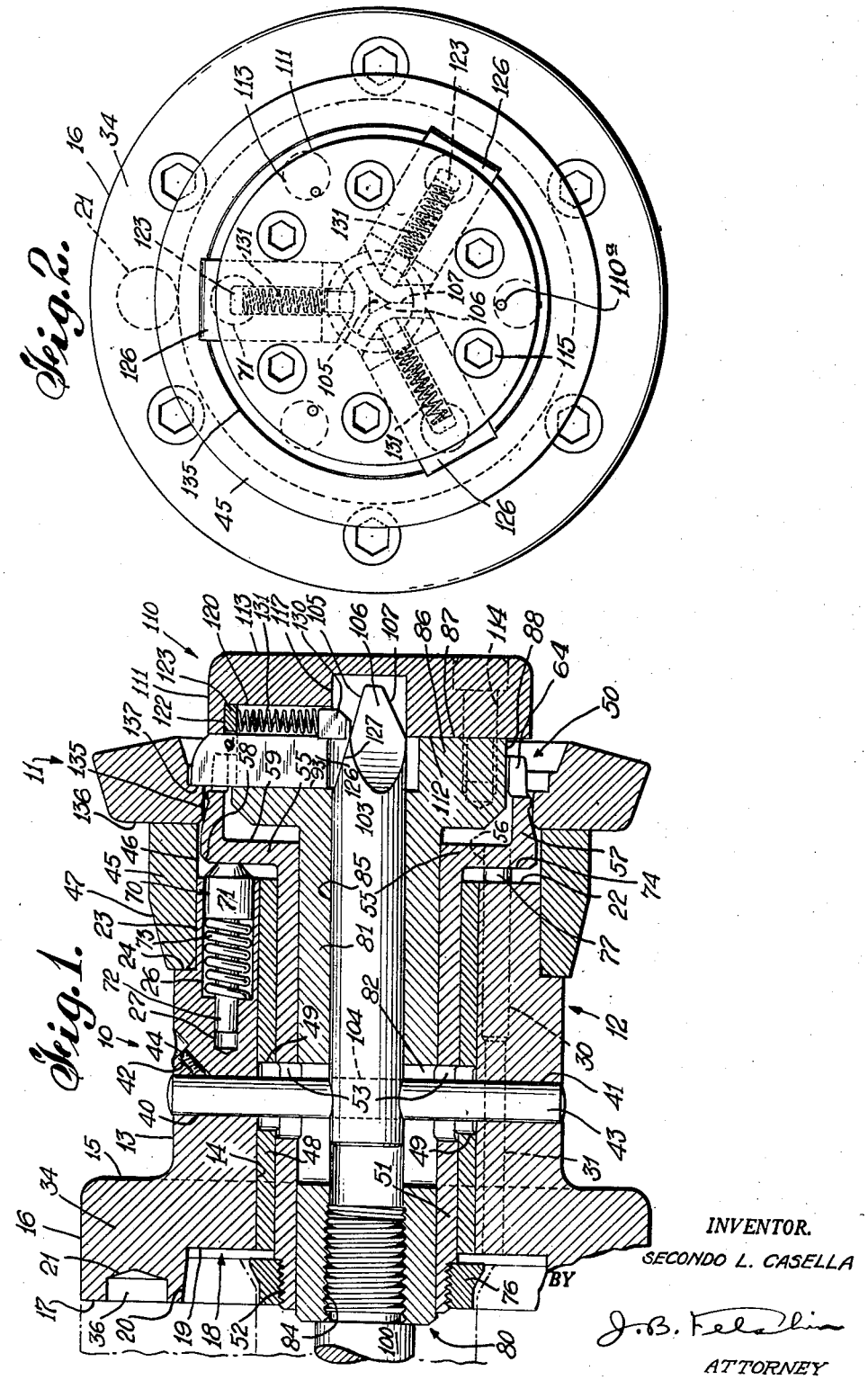

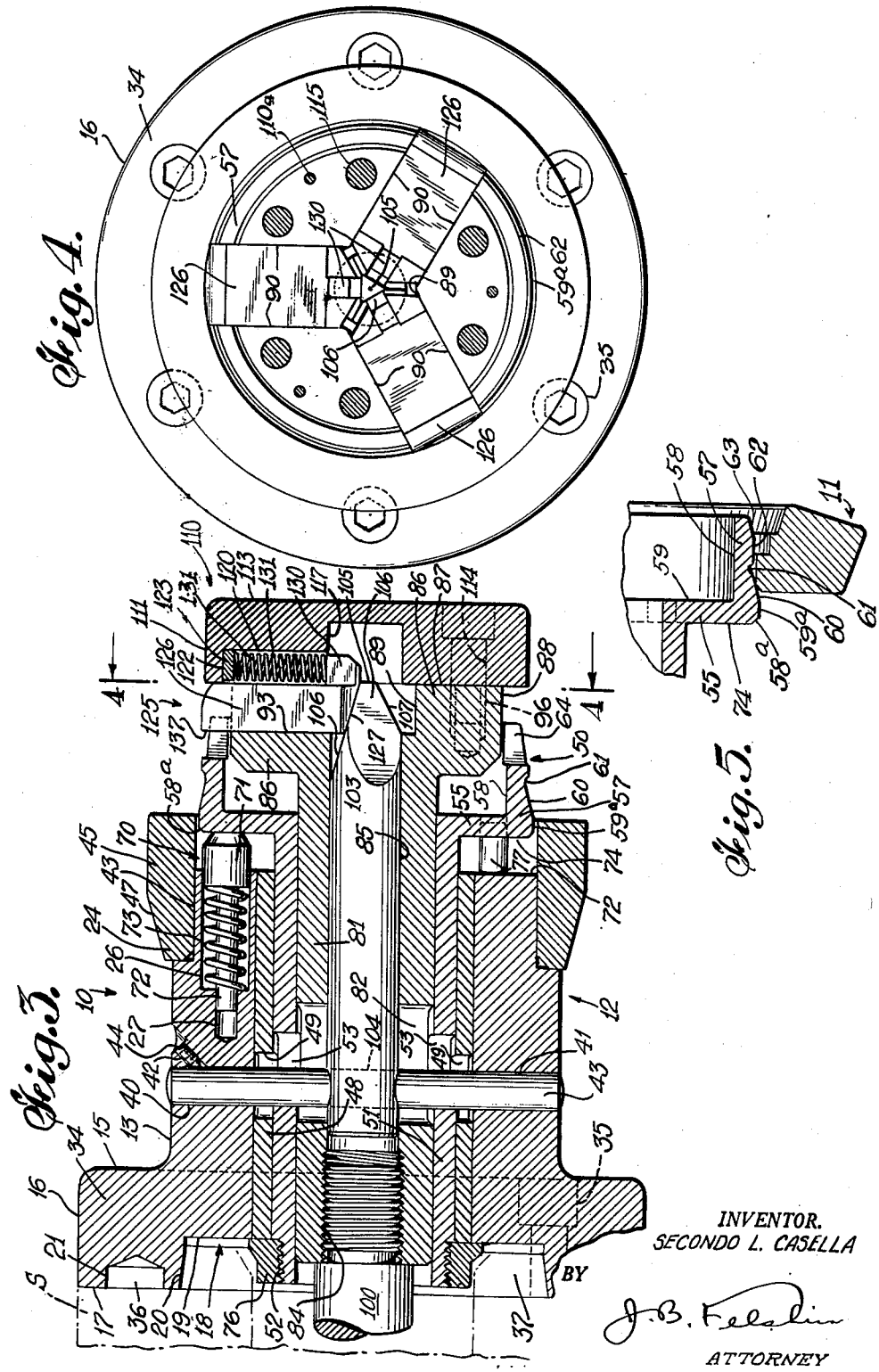

2,559,942

UNITED STATES PATENT OFFICE 2,559,942

INTERNAL COLLAPSIBLE CHUCK

Secondo L. Casella, New York, N. Y., assignor to Morey Machinery Co., Inc., New York, N. Y., a corporation of New York Application February 17, 1950, Serial No. 144,717

16 Claims. (Cl. 279—2)

1

This invention relates to internal collapsible chuck.

One object of this invention is to generally improve the chuck for lathes and the like machine tools disclosed in my Patent No. 2,462,465 issued on February 22, 1949.

The chuck embodying the invention is for chucking annular, ring-like work pieces such as beveled gear blanks, bearing rings and the like articles. In said Patent No. 2,462,465 the chuck comprises a chuck body having an annular flange or projection on which an annular work piece was fitted, means being provided to clamp the work piece fitted on such flange to the chuck body. One difficulty with such construction has been found to be that if there was some variance between the external diameter of the flange and the internal diameter of the opening in the work piece, said work piece would be chucked eccentrically.

It is therefore an object of the present invention to obviate such difficulty by providing the chuck body with a spring pressed centering member or pilot ring, having a tapered or frusto-conical external surface to fit within the central opening in the work piece, whereby work pieces of different diameters may be firmly fitted on said tapering surface of the centering member, the chuck being further provided with clamping jaws adapted to press the work piece fitted on the centering member against a locating ring on the chuck thereby providing for automatic accurate centering of the work piece and chucking thereof, even if the internal diameters of the openings in the work piece vary within certain predetermined limits.

Yet another object of this invention is to provide a durable, strong and rugged chuck of the character described which shall be relatively inexpensive to manufacture, which shall be smooth and positive in operation, easy to assemble and disassemble and which shall yet be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention, Fig. 1 is a longitudinal, cross-sectional view of

2 a chuck embodying the invention and showing a ring-like work piece chucked therein;

Fig. 2 is a front end view of the chuck embodying the invention and shown in Fig. 1;

Fig. 3 is a view similar to Fig. 1 but showing the chuck in an unloaded position before the work piece is placed thereon for chucking;

Fig. 4 is a cross-sectional view taken on line 4—4 of Fig. 3, and

Fig. 5 is an enlarged cross-sectional view of a portion of the centering member.

Referring now in detail to the drawing, 10 designates a lathe chuck embodying the invention; and 11 designates a ring-like work piece chucked thereon. The chuck 10 comprises a chuck body 12 having an outer cylindrical surface 13 and an axial through opening 14. Extending outwardly from the surface 13 is an annular flat surface 15 from which extends an annular cylindrical surface 16. At the rear end of the body 12 is a rear surface 17 formed with a countersunk recess 18 to which the through opening 14 extends. At the bottom of the recess 18 is an annular flat surface 19 and extending rearwardly therefrom is an annular surface 20 which may be tapered. The rear surface 17 may be formed with a plurality of equi-angular spaced blind openings 21 for the purpose hereinafter appearing.

The body 12 has a front annular end 22 and said body 12 is furthermore formed adjacent its front end 22 with a reduced annular surface 23. At the rear end of the reduced surface 23 is an annular shoulder 24. Said body 12 is furthermore formed in its front end 22 with a plurality of equi-angular spaced sockets 26 parallel to the axis of the body. Each socket 26 is formed with an axial opening or socket extension 27 of reduced diameter. Said body 12 is furthermore formed with a through opening 31 coaxial with the socket 30 and extending from said socket to the surface 19 of the recess 18.

Between the surfaces 15, 16 and 17 is an annular flange 34. Said flange 34 is formed with a plurality of countersunk bolt openings 35 equiangularly spaced around the flange. The bolt openings 35 are for the purpose of receiving bolts for attaching the chuck body to the spindle S of a lathe. Said spindle is provided with the usual locating pins 36 received in the sockets 21, and with a front end portion 37 received within the recess 18 and contacting the tapered surface 20 thereof. Said chuck body is furthermore formed with a pair of diametrically aligned radial openings 40 and 41 for the purpose hereinafter appearing, and with an inclined screw threaded opening 42 communicating with the opening 40 and extending to the outer cylindrical surface 13.

Attached to the chuck body 12 is a diametric jaw cam pin 43, the ends of which are received within the openings 40 and 41, and said pin traverses the axial opening 14 in the chuck body. The pin 43 may be held in place by a set screw 44 screwed into the threaded opening 42.

Mounted on the reduced portion 23 of the chuck body is a locating ring 45 having an internal diameter 46 corresponding to the external diameter of the reduced portion 23. The ring 45 has an external tapered surface 47 adjacent its rear end. The rear end of the ring 45 abuts the shoulder 24 of the chuck body. The front end of the ring 45 projects forwardly beyond the front end 22 of the chuck body. The purpose of the locating ring 45 will be hereinafter explained.

Mounted within the axial through opening 14 of the chuck body is a bushing 48. The bushing has a length extending from the bottom surface 19 of the recess 18 to the front end 22 of the chuck body. Said bushing is formed with a pair of diametrically opposed circular openings 49, concentric with the pin 43. It will be observed that the pin 43 passes through the openings 49.

Mounted within the bushing 48 is a sleeve portion 51 of a centering member 50. The sleeve portion 51 is longer than the bushing and extends beyond opposite ends of the bushing. At its rear end the sleeve portion 51 is formed with an external threaded portion 52. Said sleeve portion of the centering member is furthermore formed with a pair of diametrically opposed longitudinal slots 53 through which the pin 43 passes. The slots 53 are wider than the pin and somewhat longer than the diameter of the opening 49, so as to permit the sleeve to be moved longitudinally within certain predetermined limits. At the front end of the sleeve 51 is a flat annular outwardly extending flange 55 disposed in front of the front end 22 of the chuck body. The flange 55 is formed with a through opening 56 aligned with the socket or longitudinal opening 30 in the chuck body. Extending forwardly from the outer end of the flange 55 is an annular flange 57. Said flange 57 has an internal cylindrical surface 58 extending to the front surface 59 of the flange 55. At the outer surface of the flange 57 is a chamfer surface 58a from which extends a cylindrical surface 59a. Extending from the cylindrical surface 59a is an inwardly and forwardly tapering frusto-conical surface 60. Extending from the forward end of the surface 60 is an annular groove 61. Extending from the groove 61 is a cylindrical surface 62 having an outer diameter somewhat greater than the smallest diameter of the tapering or frusto-conical surface 60. Extending from the cylindrical surface 62 is a forwardly and inwardly tapering surface 63. The flange 57 is formed with three equiangularly spaced notches 64 in its front end, for the purpose hereinafter explained. The flange 57 extends forwardly beyond the locating ring 45. The greatest outer diameter of the flange 57 is less than the internal diameter of the locating ring 45, so that part of the flange is located within said ring.

Means is provided for resiliently pressing the centering member 50 forwardly. To this end there is slidably mounted within each socket 26, a plunger 70 having a head 71 at its forward end and provided with a central stem 72 slidably received within the opening 27. Between the head 71 and the bottom of the recess or socket 26 is a coil compression spring 73. The springs 73 press the heads 71 against the rear surface 74 of the annular flange 55 of the centering member 50. Movement of the centering member to the right or forwardly is limited by a nut 76 screwed on the rear threaded end portion 52 of the centering member. As shown in the drawing there are six spring pressed plungers 70, equiangularly spaced apart, although any suitable number may be provided. Rotation of the centering member relative to the body is prevented by means of a pin 77 whose rear end projects into the opening 30 and whose front end is received in the opening 56 of the flange 55. Thus the centering member has limited forward and backward sliding movement but cannot rotate.

Slidably mounted within the centering member 50 is a clamping member 80. Said clamping member 80 comprises a sleeve portion 81 slidably received within the sleeve portion 51 of the centering member 50. The sleeve portion 81 is formed with a pair of diametrically opposed longitudinal slots 82 longer than the slots 53 and wider than the pin 43. At the rear end of the sleeve 81 is an internally screw threaded portion 84. The sleeve 81 is formed with an axial through opening 85. The sleeve 81 is longer than the sleeve 51. At the front end of the sleeve 81 is a thickened annular flange 86. The flange 86 has a front flat surface 87 and an outer annular or cylindrical surface 88.

The flange 86 is formed in its front surface with an annular countersunk opening 89 of somewhat greater diameter than the through opening 85. The front face is also formed with three radial slots 90 extending from the countersunk opening 89 to the outer surface 88 of the flange 86. The radial grooves 90 have bottom surfaces 93. The front face 87 of flange 86 is furthermore formed with a pair of screw threaded openings 96 between each pair of adjacent slots 90. It will be noted that the pin 43 passes through the slots 82. Member 80 however can be slidably shifted back and forth within limits.

Screwed to the rear end of the clamping member 80 is a drawbar 100, which may be operated from the rear, for moving the clamping member forwardly or rearwardly.

Extending through the axial opening 85 in the sleeve 81 is an axial cam member 103. The cam member 103 comprises a cylindrical shank formed at its rear end with a diametric through opening 104 through which the pin 43 passes. The pin 43 prevents movement of the cam 103 while permitting movement of the clamping member 80 relative thereto. The front end 105 of cam 103 projects through the countersunk opening 89. The front end 105 is formed with three flat beveled surfaces 106 spaced 120° apart, in alignment with the three radial grooves 90. The surfaces 106 are inclined relative to the axis of cam member 103. Said surfaces 106 form three inclined meeting edges 107 which if extended would meet at a single point on the axis of the cam member. The front end of portion 105 however is blunted as shown in the drawing.

Attached to the front face 87 of the flange 86 is a clamping member 110. Plate 110 has an annular or cylindrical exterior surface 111. It has a face 112 contacting the face 87 of flange 86. It has a front surface 113 parallel to face 112. Its outer diameter is somewhat greater than the outer diameter of the flange 86. It is formed with a plurality of countersunk bolt openings 114 registering with the threaded openings 96 in the flange 86 for receiving bolts 115 screwed within said threaded openings 96 for fixing the plate 110 to the front flange 86 of the clamping member 80. Said plate 110 is formed at its inner side with an opening 117 communicating with the countersunk opening 89 in the front face of the flange 86. Said plate 110 is furthermore formed with three radial grooves 120 on its inner surface 112 spaced apart 120° and communicating with the central opening 117 and aligned with the grooves 90 in the front face 87. The grooves 120 are narrower than the grooves 90 and are centered with respect thereto, and each terminates short of the outer surface 111 in an outer shoulder or end surface 122. Contacting the surface 122 of each groove 120 is a spring pad 123.

Slidably mounted within each of the grooves 90 is a clamping jaw 125. Each jaw 125 has a portion 126 extending within the groove 90 and contacting the rear surface 93 thereof. Each jaw 125 furthermore, has a bottom beveled surface 127 contacting one of the beveled surfaces 106 of the cam member 103. Extending forwardly from the inner end of each member 125 is a lug or projection 130 aligned with one of the grooves 120. Interposed between each lug 130 and spring pad 123 is a coil compression spring 131. The springs 131 tend to slide the radial jaw members 125 inwardly towards the axis of the cam member 103 as the clamping member 80 is moved to the right or forwardly, such movement being permitted by the sliding of the surfaces 127 of the jaw members 125 on the surfaces 106 of the cam member 103. It will be noted that the portions 126 of members 125 pass through the notches 64 in the flanges 57 of the centering member.

As the drawbar 100 is moved to the left, the clamping member 80 is likewise moved to the left and the jaw members 125 are forced radially outwardly compressing the springs 131 and said jaws are at the same time moved rearwardly from the position shown in Fig. 3 to the position shown in Fig. 1.

Plate 110 may be pinned to flange 86 by dowel pins 110a.

The work piece 11 to be chucked is formed with a central through opening 135 into which the flange 57 projects. Said work piece 11 has a rear face 136 which contacts the front edge of the locating ring 45. Said work piece is formed with an internal flange having a front face 137 adapted to be engaged by the outer ends of the rear faces of the jaws 125. The jaws 125 thus press the work piece against the front end of the locating ring 45. The work piece 11 is centered by means of the flange 57 of the centering member 50. The rear edge of the internal surface or opening 135 of the work piece contacts the frusto-conical surface 60 of the centering member. Because surface 60 is tapered or frusto-conical it will contact the inner surface of the work piece at the opening 135 even if the diameter of said opening 135 varies within limits.

The spring pressed heads 71 press the flange 57 into the opening 135 so that the work piece is firmly held and centered. Obviously if the opening 135 were somewhat enlarged, the spring pressed plungers will move the centering member 50 a little more to the right or forwardly, but within certain limits the work piece will be centered accurately. The centering and chucking are done automatically.

To take the work piece off, the drawbar is moved forwardly drawing the jaws radially inwardly to the position shown in Fig. 3, in which position the work piece may be slipped off the chuck. With the chuck in the position of Fig. 3 the work piece may be slipped over the front end of the chuck to contact the front end of the locating ring 45. The drawbar 100 is then pulled to the left or rearwardly and the work piece is automatically centered and chucked as explained herein.

It will be noted that the jaws 125 are received in the notches 64 of the centering member 50. Since the jaws slide on the clamping member 80 the clamping member is prevented from rotating by reason of the fact that the jaws slide in the notches and hence prevent the clamping member from turning. It will be further noted that if the internal diameter of the opening 135 of the work piece 11 is greater in diameter than the diameter of surface 62 of the centering member eccentricity of the work piece relative to the chuck is nevertheless prevented by engagement of the work piece with the tapered surface 60 of said centering member.

It will be thus seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. A chuck comprising a chuck body having an axial through opening, a centering member slidably and non-rotatably mounted within said chuck body, spring pressed means for moving the centering member in one direction axially relative to the chuck body, said centering member being formed with a frusto-conical surface adapted to be received within the opening in a work piece to be chucked, and means to clamp the work piece to the chuck body, said means comprising a member movable axially of the body, members mounted for movement radially of said last member, and means to move said radially movable members radially of the member on which they are mounted.

2. A chuck comprising a chuck body formed with an axial through opening, a centering member having an axial sleeve within said through opening, means to prevent rotation of the centering member relative to the chuck body, said centering member further comprising a flat annular flange extending from one end of the sleeve and disposed in front of the front end of the chuck body, spring pressed means interposed between the chuck body and said flange to resiliently press the centering member forwardly, an annular flange extending from the first flange of the centering member and formed with an external inwardly and forwardly tapering frusto-conical surface adapted to engage within the central opening of a ring shaped work piece, and means to clamp the work piece to the chuck body.

3. A chuck comprising a chuck body formed with a through opening, a centering member slidably and non-rotatably mounted thereon, spring means to move the centering member forwardly of the chuck body, said centering member being formed with an external frusto-conical surface, a clamping member slidably mounted on the chuck body, a cam member fixed relative to the chuck body, and jaws mounted for radial sliding movement on the clamping member and adapted to be moved radially outwardly by the cam member upon sliding the clamping member rearwardly relative to the chuck body.

4. A chuck comprising a chuck body formed with a through opening, a centering member slidably and non-rotatably mounted thereon, spring means to move the centering member forwardly of the chuck body, said centering member being formed with an external frusto-conical surface, a clamping member slidably mounted on the chuck body, a cam member fixed relative to the chuck body, and jaws mounted for radial sliding movement on the clamping member and adapted to be moved radially outwardly by the cam member upon sliding the clamping member rearwardly relative to the chuck body, and spring means to slidably move the jaws radially inwardly upon moving the clamping member forwardly relative to the chuck body.

5. A chuck comprising a chuck body formed with an axial through opening, a centering member having a sleeve slidably and non-rotatably mounted within said through opening, said centering member being formed with an external inwardly and forwardly tapering frusto-conical surface, spring means on the chuck body for resiliently pressing the centering member forwardly of the chuck body, means to limit forward movement of the centering member relative to the chuck body, a clamping member comprising a sleeve disposed within the sleeve of said centering member, said clamping member being slidable relative to said centering member and chuck body, said clamping member being formed with radial grooves, jaws slidably mounted within said grooves, an axial cam member disposed within the sleeve portion of said clamping member, means to fix said cam member to said chuck body, said cam member being formed with tapering surfaces engaging said jaws, whereby movement of the clamping member in a rearwardly direction will cause said jaws to move radially outwardly and towards the chuck body.

6. A chuck comprising a chuck body formed with an axial through opening, a centering member having a sleeve slidably and non-rotatably mounted within said through opening, said centering member being formed with an external inwardly and forwardly tapering frusto-conical surface, spring means on the chuck body for resiliently pressing the centering member forwardly of the chuck body, means to limit forward movement of the centering member relative to the chuck body, a clamping member comprising a sleeve disposed within the sleeve of said centering member, said clamping member being slidable relative to said centering member and chuck body, said clamping member being formed with radial grooves, jaws slidably mounted within said grooves, an axial cam member disposed within the sleeve portion of said clamping member, means to fix said cam member to said chuck body, said cam member being formed with tapering surfaces engaging said jaws, whereby movement of the clamping member in a rearwardly direction will cause said jaws to move radially outwardly and towards the chuck body, and a front plate fixed to the front end of said clamping member, spring means interposed between the jaws and the clamping plate for moving the clamping jaws radially inwardly upon moving the clamping member forwardly.

7. A chuck comprising a chuck body formed with an axial through opening, a centering member having a sleeve slidably and non-rotatably mounted within said through opening, said centering member being formed with an external inwardly and forwardly tapering frusto-conical surface, spring means on the chuck body for resiliently pressing the centering member forwardly of the chuck body, means to limit forward movement of the centering member relative to the chuck body, a clamping member comprising a sleeve disposed within the sleeve of said centering member, said clamping member being slidable relative to said centering member and chuck body, said clamping member being formed with radial grooves, jaws slidably mounted within said grooves, an axial cam member disposed within the sleeve portion of said clamping member, means to fix said cam member to said chuck body, said cam member being formed with tapering surfaces engaging said jaws, whereby movement of the clamping member in a rearwardly direction will cause said jaws to move radially outwardly and towards the chuck body, and a front plate fixed to the front end of said clamping member, spring means interposed between the jaws and the clamping plate for moving the clamping jaws radially inwardly upon moving the clamping member forwardly, and a locating ring mounted on the front end of said chuck body and extending forwardly thereof, and having an internal diameter greater than the greatest diameter of the frusto-conical surface of said centering member.

8. A chuck comprising a chuck body formed with an axial through opening, a centering member having a sleeve slidably and non-rotatably mounted within said through opening, said centering member being formed with an external inwardly and forwardly tapering frusto-conical surface, spring means on the chuck body for resiliently pressing the centering member forwardly of the chuck body, means to limit forward movement of the centering member relative to the chuck body, a clamping member comprising a sleeve disposed within the sleeve of said centering member, said clamping member being slidable relative to said centering member and chuck body, said clamping member being formed with radial grooves, jaws slidably mounted within said grooves, an axial cam member disposed within the sleeve portion of said clamping member, means to fix said cam member to said chuck body, said cam member being formed with tapering surfaces engaging said jaws, whereby movement of the clamping member in a rearwardly direction will cause said jaws to move radially outwardly and towards the chuck body, and a front plate fixed to the front end of said clamping member, spring means interposed between the jaws and the clamping plate for moving the clamping jaws radially inwardly upon moving the clamping member forwardly, and a locating ring mounted on the front end of said chuck body and extending forwardly thereof, and having an internal diameter greater than the greatest diameter of the frusto-conical surface of said centering member, and means to prevent rotation of the centering member relative to said chuck body.

9. A chuck comprising a chuck body formed with an axial through opening, a centering member having a sleeve slidably and non-rotatably mounted within said through opening, said centering member being formed with an external inwardly and forwardly tapering frusto-conical surface, spring means on the chuck body for resiliently pressing the centering member forwardly of the chuck body, means to limit forward movement of the centering member relative to the chuck body, a clamping member comprising a sleeve disposed within the sleeve of said centering member, said clamping member being slidable relative to said centering member and chuck body, said clamping member being formed with radial grooves, jaws slidably mounted within said grooves, an axial cam member disposed within the sleeve portion of said clamping member, means to fix said cam member to said chuck body, said cam member being formed with tapering surfaces engaging said jaws, whereby movement of the clamping member in a rearwardly direction will cause said jaws to move radially outwardly and towards the chuck body, and a front plate fixed to the front end of said clamping member, spring means interposed between the jaws and the clamping plate for moving the clamping jaws radially inwardly upon moving the clamping member forwardly, and a locating ring mounted on the front end of said chuck body and extending forwardly thereof, and having an internal diameter greater than the greatest diameter of the frusto-conical surface of said centering member, and means to prevent rotation of the centering member relative to said chuck body, the means for fixing said cam member to the chuck body comprising a diametric pin fixed to the chuck body, said cam member having an opening through which said transverse pin passes, and said sleeve portions of said centering member and clamping member being provided with diametrically opposed slots through which said transverse pin passes.

10. A chuck comprising a chuck body formed with an axial through opening, a centering member having a sleeve slidably and non-rotatably mounted within said through opening, said centering member being formed with an external inwardly and forwardly tapering frusto-conical surface, spring means on the chuck body for resiliently pressing the centering member forwardly of the chuck body, means to limit forward movement of the centering member relative to the chuck body, a clamping member comprising a sleeve disposed within the sleeve of said centering member, said clamping member being slidable relative to said centering member and chuck body, said clamping member being formed with radial grooves, jaws slidably mounted within said grooves, an axial cam member disposed within the sleeve portion of said clamping member, means to fix said cam member to said chuck body, said cam member being formed with tapering surfaces engaging said jaws, whereby movement of the clamping member in a rearwardly direction will cause said jaws to move radially outwardly and towards the chuck body, and a front plate fixed to the front end of said clamping member, spring means interposed between the jaws and the clamping plate for moving the clamping jaws radially inwardly upon moving the clamping member forwardly, and a locating ring mounted on the front end of said chuck body and extending forwardly thereof, and having an internal diameter greater than the greatest diameter of the frusto-conical surface of said centering member, and means to prevent rotation of the centering member relative to said chuck body, the means for fixing said cam member to the chuck body comprising a diametric pin fixed to the chuck body, said cam member having an opening through which said transverse pin passes, and said sleeve portions of said centering member and clamping member being provided with diametrically opposed slots through which said transverse pin passes, and a bushing interposed between said sleeve portion of said centering member and the inner surface of the through opening in said chuck body.

11. A chuck comprising a chuck body formed with an axial through opening, a centering member having an axial sleeve within said through opening, means to prevent rotation of the centering member relative to the chuck body, said centering member further comprising a flat annular flange extending from one end of the sleeve and disposed in front of the front end of the chuck body, spring pressed means interposed between the chuck body and said flange to resiliently press the centering member forwardly, an annular flange extending from the first flange of the centering member and formed with an external inwardly and forwardly tapering frusto-conical surface adapted to engage within the central opening of a ring shaped work piece, and means to clamp the work piece to the chuck body, and a bushing interposed between the sleeve of the centering member and the surface of the through opening in said chuck body.

12. A chuck comprising a chuck body having an axial through opening, a centering member slidably and non-rotatably mounted within said chuck body, spring pressed means for moving the centering member in one direction relative to the chuck body, said centering member being formed with a frusto-conical surface adapted to be received within the opening in a work piece to be chucked, and means to clamp the work piece to the chuck body, said means comprising a clamping member, means to prevent rotation of said clamping member relative to the chuck body, and a plurality of members mounted on the clamping member with radial movement with respect thereto.

13. A chuck comprising a chuck body formed with a through opening, a centering member slidably and non-rotatably mounted thereon, spring means to move the centering member forwardly of the chuck body, said centering member being formed with an external frusto-conical surface, a clamping member slidably mounted on the chuck body, a cam member fixed relative to the chuck body, and jaws mounted for radial sliding movement on the clamping member and adapted to be moved radially outwardly by the cam member upon sliding the clamping member rearwardly relative to the chuck body, and means to prevent rotation of the centering member relative to the chuck body.

14. A chuck comprising a chuck body formed with a through opening, a centering member slidably and non-rotatably mounted thereon, springs means to move the centering member forwardly of the chuck body, said centering member being formed with an external frusto-conical surface, a clamping member slidably mounted on the chuck body, a cam member fixed relative to the chuck body, and jaws mounted for radial sliding movement on the clamping member and adapted to be moved radially outwardly by the cam member upon sliding the clamping member rearwardly relative to the chuck body, means to prevent rotation of the centering member relative to the chuck body, and means to prevent rotation of said clamping member relative to said chuck body.

15. A chuck comprising a chuck body formed with a through opening, a centering member slidably and non-rotatably mounted thereon, spring means to move the centering member forwardly of the chuck body, said centering member being formed with an external frusto-conical surface, a clamping member slidably mounted on the chuck body, a cam member fixed relative to the chuck body, and jaws mounted for radial sliding movement on the clamping member and adapted to be moved radially outwardly by the cam member upon sliding the clamping member rearwardly relative to the chuck body, said centering member being formed with notches and said jaws being received within said notches.

16. A chuck comprising a chuck body formed with an axial through opening, a centering member having a sleeve slidably and non-rotatably mounted within said through opening, said centering member being formed with an external inwardly and forwardly tapering frusto-conical surface, spring means on the chuck body for resiliently pressing the centering member forwardly of the chuck body, means to limit forward movement of the centering member relative to the chuck body, a clamping member comprising a sleeve disposed within the sleeve of said centering member, said clamping member being slidable relative to said centering member and chuck body, said clamping member being formed with radial grooves, jaws slidably mounted within said grooves, an axial cam member disposed within the sleeve portion of said clamping member, means to fix said cam member to said chuck body, said cam member being formed with tapering surfaces engaging said jaws, whereby movement of the clamping member in a rearwardly direction will cause said jaws to move radially outwardly and towards the chuck body, and a front plate fixed to the front end of said clamping member, spring means interposed between the jaws and the clamping plate for moving the clamping jaws radially inwardly upon moving the clamping member forwardly, and means on the centering member and engaging said jaws to prevent rotation of the clamping member relative to said centering member, and means to prevent rotation of the centering member relative to said chuck body.

SECONDO L. CASELLA.

REFERENCES CITED

The following references are of record in the file of this patent:

UNITED STATES PATENTS

| Number | Name | Date |
|--------|------|------|
| 984,809 | Goodrich | Feb. 21, 1911 |
| 1,867,266 | Johnson et al. | July 12, 1932 |
| 1,900,934 | Hudson | Mar. 14, 1933 |
| 1,947,957 | Tillman | Feb. 20, 1934 |
| 2,050,828 | Buell | Aug. 11, 1936 |
| 2,462,465 | Casella | Feb. 22, 1949 |